United States Patent [19]
Richert

[11] Patent Number: 5,286,980
[45] Date of Patent: Feb. 15, 1994

[54] PRODUCT DISCRIMINATION SYSTEM AND METHOD THEREFOR

[75] Inventor: Gerald R. Richert, Three Rivers, Calif.

[73] Assignee: OMS-Optical Measuring Systems, Three Rivers, Calif.

[21] Appl. No.: 969,111

[22] Filed: Oct. 30, 1992

[51] Int. Cl.⁵ ............................................. G01N 21/86
[52] U.S. Cl. .................................. 250/560; 250/226; 250/227.11; 209/586
[58] Field of Search .............. 250/223 R, 226, 227.11, 250/227.2, 560; 209/580, 581, 582, 586

[56] References Cited

U.S. PATENT DOCUMENTS

| | | | |
|---|---|---|---|
| 4,106,628 | 8/1978 | Warkentin et al. | 209/74 M |
| 4,825,068 | 4/1989 | Suzuki et al. | 250/226 |
| 4,961,489 | 10/1990 | Warkentin | 198/365 |
| 5,018,864 | 5/1991 | Richert | 356/372 |
| 5,029,692 | 7/1991 | Warkentin | 198/365 |
| 5,106,195 | 4/1992 | Richert | 356/407 |
| 5,156,278 | 10/1992 | Aaron et al. | 209/586 |

*Primary Examiner*—David C. Nelms
*Attorney, Agent, or Firm*—Lyon & Lyon

[57] ABSTRACT

A product discrimination system using a fiber optic sensing system and a line scan camera sensor for recalibration of the fiber optic system. A plurality of fiber optic sensing stations measure reflected light spectra of products conveyed past the stations. The line scan camera is positioned adjacent one of the fiber optic sensors at one of the stations. A standard object is positioned adjacent conveyor so as to also be viewed by the line scan camera. The line scan camera recalibrates itself based on the standard object and is compared with the adjacent fiber optic station to recalibrate results from the fiber optic system.

22 Claims, 6 Drawing Sheets

PRODUCT DISCRIMINATION SYSTEM AND METHOD THEREFOR

BACKGROUND OF THE INVENTION

The field of the present invention is product discrimination systems based on sensed light spectra.

Product handling activities for the discrimination of product units have long been used, particularly in the food product industry. Such discrimination has been based on size, ripeness, color, blemishes and the like. Until recent times, this activity was generally undertaken by manual labor. The versatility of workers for handling and processing large amounts and varieties of food products has generally been unsurpassed. Such processing systems generally include conveyor passing working stations where workers were able to distinguish and separate product units. Such labor was generally inexpensive and seasonal. However, difficulties in finding experienced seasonal workers and the normal administrative problems associated with a fluctuating work force have long created a need for less labor intensive systems.

In defining the needs for product handling systems, as particularly applied to the food industry, the nature, volume, relative unit cost and variety of products severely inhibit the design of handling equipment. Most food products must be handled with great care to avoid damage. The perishable nature and large batch quantities of products in season makes rapid processing a necessity. The variety of products which must be processed at different times to economically justify a food processing facility places great demand for versatility on the equipment. Thus, a substantial challenge exists in creating handling equipment to replace the versatile human worker.

An early system for handling of products in a manner acceptable for automatic sorting is disclosed in U.S. Pat. No. 4,106,628 to Warkentin et al. for SORTER FOR FRUIT AND THE LIKE, the disclosure of which is incorporated herein by reference. In this patented device, cups are arranged on a chain conveyor for holding individual product units. Solenoids act to dump selected cups for product separation responsive to discriminating sensing and electronic commands. Other separating systems include devices for batting or blowing selected units from a conveyor.

In the early system of U.S. Pat. No. 4,106,628, color from a product unit is directed through lenses, fiber optics and filters to a sensing mechanism. In the actual system, light from both sides of a product unit was gathered in a single scan per product unit by two bundles of optic fibers looking from opposed sides of the product unit. Each optic fiber bundle was split and combined with a respective split portion of the other bundle. Therefore, each resulting optic fiber bundle had light from both sides of the product unit. Filters of different wavelength capacity were employed to filter the light derived from the resulting two fiber optic bundles. Red and green filters were given as examples, one filter for each resulting bundle. The signals generated by the filtered light were then compared with a standard such that a red/green color classification could have been made based on the readings compared with the standard.

Another system which has been in use for some time is disclosed in U.S. Pat. No. 4,961,489 to Warkentin for PRODUCT HANDLING SYSTEM, the disclosure of which is incorporated herein by reference. In this device, a conveyor is employed which includes elements capable of tipping to off-load individual units of a product being processed. The nature of the conveyor permits some variety in shapes and sizes, including elongated products. However, a range of round or oval products in smaller sizes is not as easily accommodated by this system.

Another system which has been in use successfully for some time is disclosed in U.S. Pat. No. 5,029,692 to Warkentin for OFF-LOADING CONVEYING SYSTEM, the disclosure of which is incorporated herein by reference. In this device, a conveyor is employed which includes concave rollers defining concavities therebetween. Off-loading elements are positioned between adjacent rollers in each of the concavities. The elements are pivotally mounted about pivot axes parallel to the conveying direction and can be actuated to off-load product units away from these pivot axes.

A product discrimination system employing the sensing of a variety of light spectra, which may include wavelengths both in and beyond the visible spectrum, from product units being classified is disclosed in U.S. Pat. No. 5,018,864 and U.S. Pat. No. 5,106,195, both to Richert for PRODUCT DISCRIMINATION SYSTEM AND METHOD THEREFOR, the disclosures of which are incorporated herein by reference. The system has particular utility in sorting food products such as fruits and vegetables. The magnitudes of the sensed light spectra is analyzed to determine such attributes of a product as size, ripeness, blemishes and color. A manageable amount of data is received and processed by such a system with a maximum number of product factors being determined.

In the system of U.S. Pat. Nos. 5,018,864 and 5,106,195, a focused image of a product unit is directed to a fiber optic array. The array has a first end which is arranged in a rectangle. Because of this arrangement, the fiber optic cable receives what approximates a line scan image. The image may be averaged and then divided and directed through filters to provide a plurality of sensed signals for different wavelengths. Intensity may be measured for each selected wavelength spectrum. Consequently, only a few signals, the magnitude of each separately filtered portion of the image, need be processed. Methods for discriminating attributes of product units use absolute magnitudes and comparative relationships between magnitudes of various spectra of light sensed from a product unit to determine such attributes as size, color, ripeness and blemishes. Such methods may be carried out on a variety of sensing hardware including line scan cameras as well as the fiber optic system of the preferred embodiment. Even a combination of such systems was suggested.

More complicated sensing devices have been developed which use line scan cameras for determining such attributes as cross-sectional area. Such cameras have used light to present pixel information which may then be processed for summation and the like. For example, cross-sectional area may be determined by counting the number of pixels registering presence of the product unit. Such systems collect information in the form of pixel location, color or colors, and intensity, generating a substantial amount of data to be received and processed.

A system used with such off-loading conveyors for discriminating product units is disclosed in U.S. patent application Ser. No. 479,107, filed Feb. 13, 1990, now U.S. Pat. No. 5,156,278 to Warkentin et al. for PRODUCT DISCRIMINATION SYSTEM AND METHOD THEREFOR, the disclosure of which is incorporated herein by reference. A fiber optic system is used to sense physical attributes of the conveyed product units. A system for rotating the fruit between sensors provided added accuracy. Multiple sensing of the product is accomplished in series with a partial rotation of the product unit between each sensing and with the product stationary during each sensing. The rotation is accomplished by driving the supporting elements on the conveyor. Such rotation and multiple sensing provides substantial capabilities in the accuracy and variety of measurements derived from the process. An extended drive is provided for rotation of the supporting elements and, in turn, the product units on the conveyor prior to the sensing operation. Fruit and vegetable product units tend to be nonuniform and difficult to singulate and properly position on a conveyor. The rotation of such product units on the supporting elements tends to allow them to properly orientate, seat in a conveyor cavity and separate one from another such that sensing is enhanced.

SUMMARY OF THE INVENTION

The present invention is directed to a method and to apparatus for the discrimination of product units using a multiple sensing system. Two views of a product unit oriented in the same manner are advantageously compared to more accurately discriminate as to the viewed product unit.

In a first aspect of the present invention, an individual product unit may be sensed multiple times to accumulate multiple values representing size of the product unit. Using yet another sensor adjacent to one of the first sensors, another value representative of size is accumulated. The sensor is repeatedly recalibrated through sensing of a standard. Any difference in size values between the adjacent sensors is then applied to a resultant value of size as defined by the first set of sensors to correct the resultant size value for accurate product discrimination.

In another aspect of the present invention, a series of sensors are employed to determine a resultant value of size. These sensors employ sensed magnitude of reflected light as a measurement of size. Adjacent to one of the sensors of the first series of sensors is yet another sensor which employs line scan imaging. Again, the difference between readings on the adjacent sensors may be used to correct the resultant value of size determined by the first series of sensors.

In yet another aspect of the present invention, the difference between representative sizes of adjacent sensing units is used to determine ripeness of a product unit. One of the adjacent sensors relies on line scan pixel imaging while the other relies on magnitude of reflected light in determining cross-sectional size.

Accordingly, it is an object of the present invention to provide improved discrimination of product units. Other and further objects and advantages will appear hereinafter.

DETAILED DESCRIPTION OF THE PREFERRED EMBODIMENT

Figure 1:
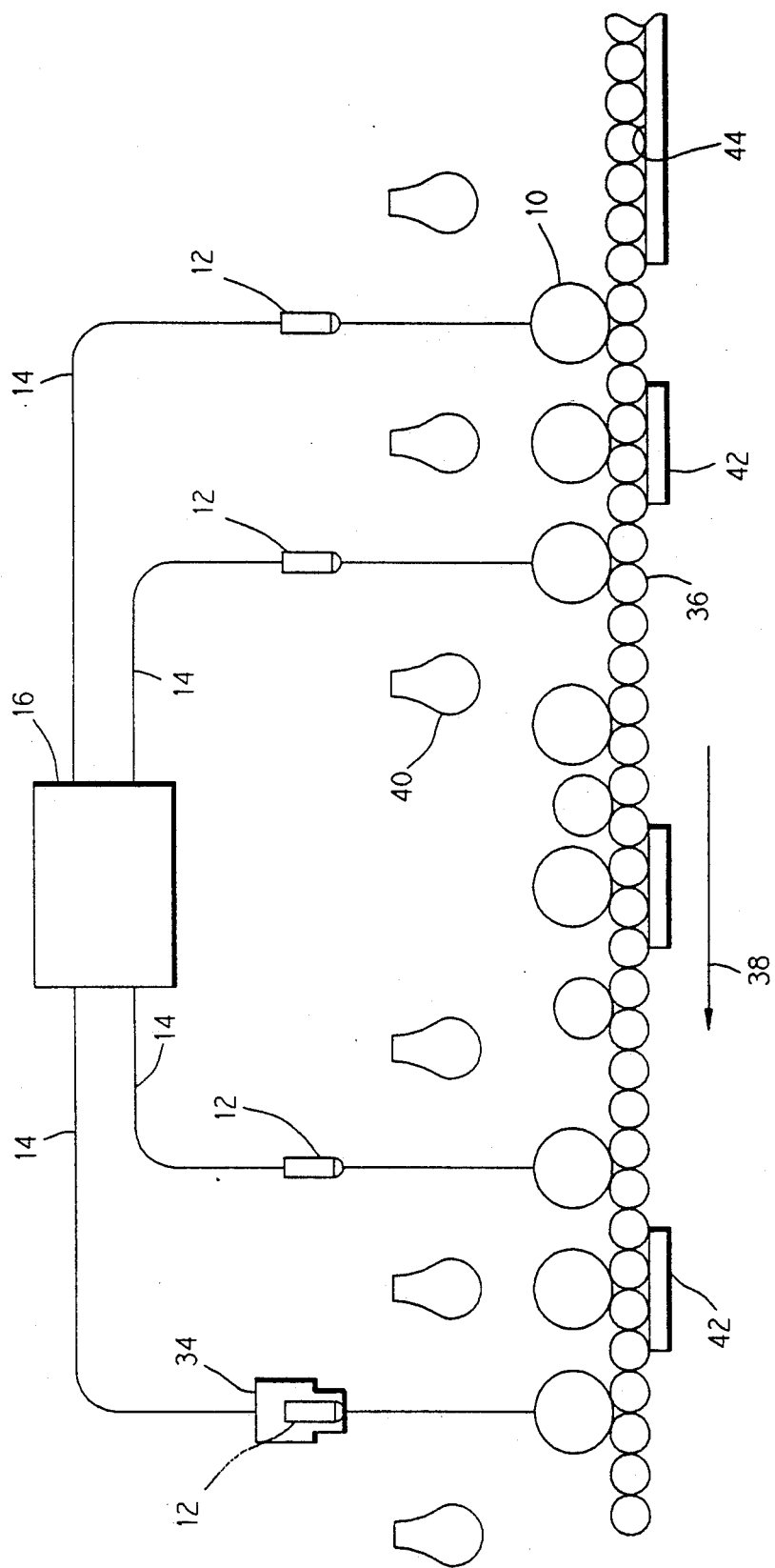
FIG. 1 is a schematic side view of a conveying system employed with the present invention.
Figure 2:
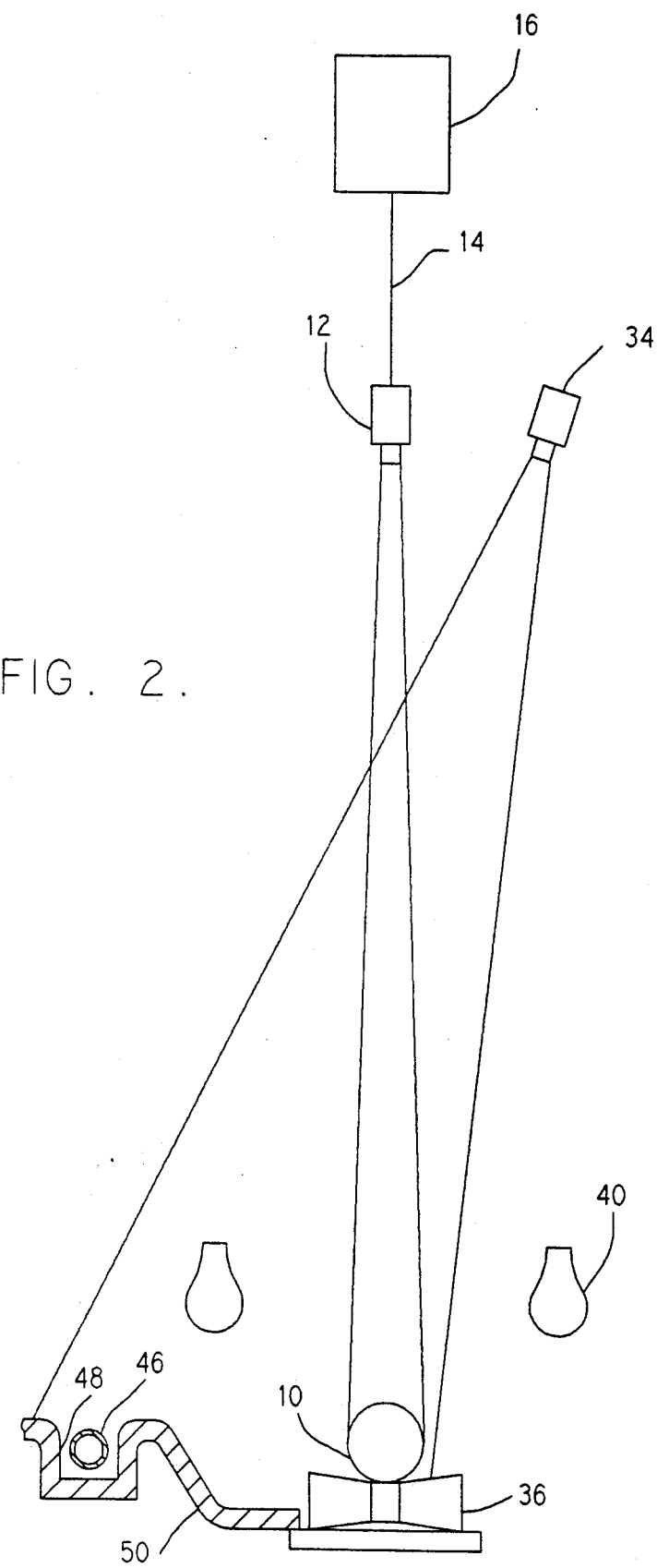
FIG. 2 is a schematic end view of the device of FIG. 1.

A product discrimination system is schematically illustrated in FIGS. 1 and 2. One or more objects 10 which are units of product to be sensed are brought into appropriate position at a viewing station by a conveying means. Such a conveying means is illustrated in copending U.S. patent application Ser. No. 479,107, filed Feb. 13, 1990, referenced above, as an example of such a system contemplated for use with the preferred embodiment. The objects 10 may be illuminated as needed for appropriate sensing by conventional lights. Lens assemblies 12 are positioned to view and sense the electromagnetic energy, or light spectrum, from the objects 10 to operate as sensors. It is possible to sense characteristics of each product unit passing through a station with one, two, three or more lens assemblies 12 directed at each station. With two such lens assemblies, a substantial portion of the object may be viewed. Additionally, or alternatively, the object may be rotated in between stations for sensing further along the conveyor path to achieve greater viewing capabilities. Fiber optic cables 14 convey the sensed electromagnetic energy to a signal conditioning and processing unit 16. Depending on the capability of the processing unit, more than one station may be established on separate conveying paths with separate sets of lens assemblies.

Looking in greater detail to the optical sensing device, each lens assembly 12 includes a housing 18 with a lens 20 positioned at an aperture in the housing 18. The lens 20 is positioned at a specific distance from the path along which product units are to pass. With the single lens 20, a focal plane is thus defined within the housing 18. But for the aperture at which the lens 20 is located, the housing 18 is closed to prevent extraneous light from entering the housing and projecting on the focal plane.

Extending into the lens assembly 12 is a randomized fiber optic cable 14. Such a cable 14 is made up of a plurality of light transmitting fibers which are randomly bundled such that a pattern of light impinging on one end of the cable 14 will be mixed, or averaged, upon exiting the other end of the cable 14.

Figure 3:
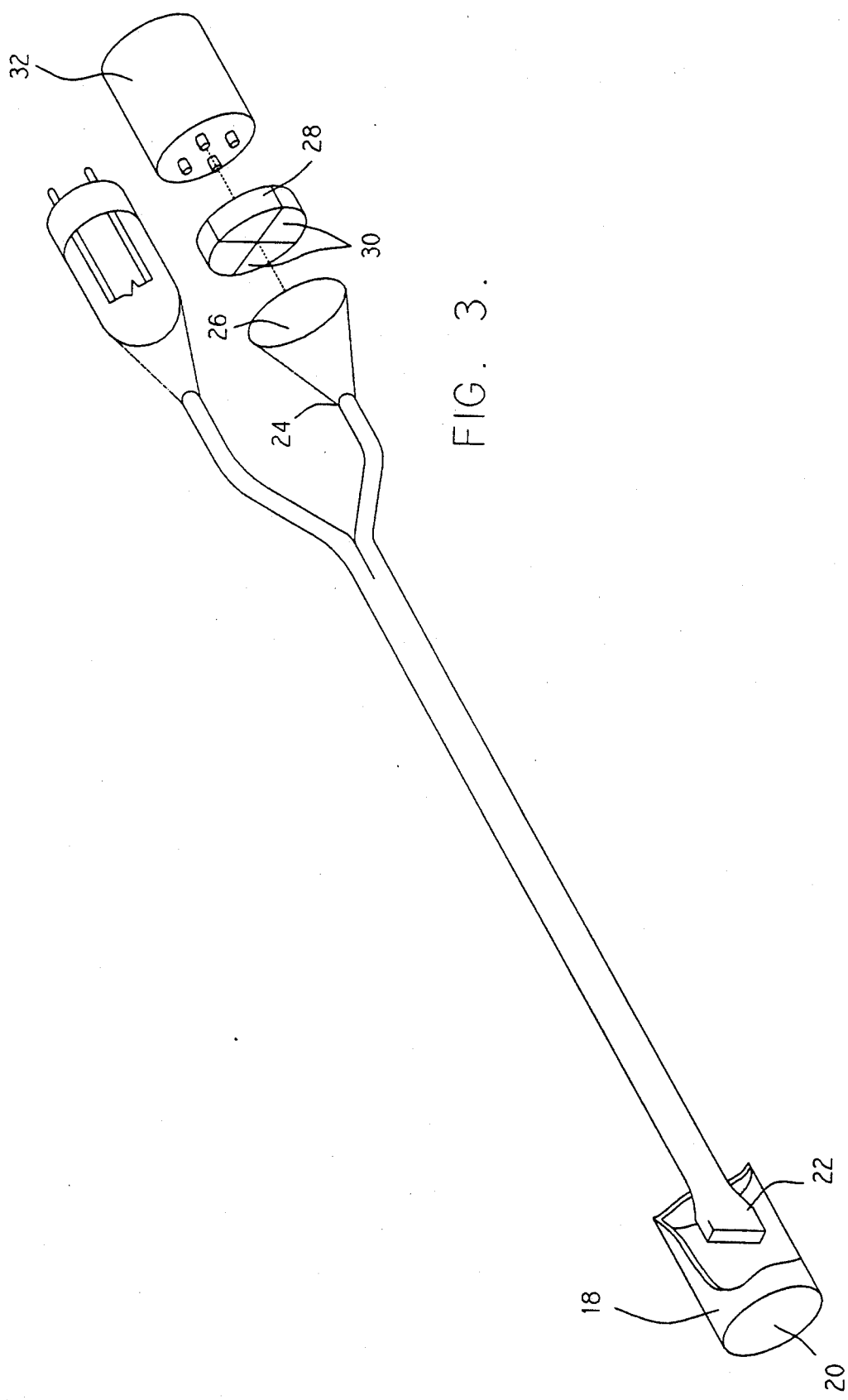
FIG. 3 is a perspective view of an optical sensing device employed with the present invention.

The cable 14 has a first end 22 which is positioned at the focal plane of the lens 20. Further, the first end 22 is arranged in a thin rectangular pattern in that focal plane. The pattern of this first end 22 is best illustrated in FIG. 3. The arrangement of the first end 22 in a thin rectangular array at the focal plane of the lens 20 causes the image received by the cable 14 to be a thin rectangular scan area of the pathway through which product units travel. The image received by the cable 14 is, therefore, like that of a line scan camera. The length of the scan area transverse to the direction of movement of the product unit is preferably greater than the largest dimension transverse to the conveying path of any anticipated product unit 10. The width of the rectangular scan area parallel to the direction of movement is substantially smaller than the dimension along the conveying path of any anticipated product unit 10.

Given a constant speed of advancement of each product unit along the conveying path, the discrimination system can be configured such that sequential sensings are made as the product passes by the lens assemblies 12. A complete view of each product unit 10 may be achieved by collecting sequential readings from the scan area as the product moves across that scan area. The light energy received by the rectangular first end 22 of the cable 14 is transmitted along the cable to a second end 24. The second end 24 is conveniently circular in the present embodiment. The light transmitted through the cable 14 is averaged and directed against a plano convex lens 26. The lens 26 is positioned such that the second end 24 lies at the focal point of the lens. Thus, the light passing through the lens from the second end 24 of the cable 14 is directed in a substantially non-converging and nondiverging path. If the second end 24 of the cable 14 is in a circular shape, a similar yet magnified pattern will be transmitted by the lens 26.

Adjacent the lens 26 is a filter assembly 28. The filter assembly 28 may be positioned against or near the lens 26 to receive the light from the cable 14. This filter assembly 28 includes filter elements 30. The filter elements 30 are selected such that the separate elements filter different spectra of light. Thus, the filter assembly may include, for example, a red filter, a green filter, a yellow filter, and an infrared filter outside of the visual spectrum. If the light from the lens 26 is arranged as discussed above, the filter assembly 28 is most conveniently circular with sectors of the circular assembly constituting the filter elements 30. Thus, from a rectangular image of a small slice of the product unit being viewed, a plurality of differently filtered light portions of the averaged light of the image are derived through the filter assembly 28. Four such equal portions are shown in the preferred embodiment. However, other arrangements could well be found beneficial for viewing particular product units.

To receive the divided and filtered portions of light from the original image, photodiodes 32 are presented adjacent the filter elements 30. In the preferred embodiment, one such diode 32 is associated with each filter element sector 30. Thus, an electronic signal is generated by each diode responsive to the magnitude of light conveyed through each of the filter elements.

The magnitude of each filtered portion may be compared against a standard stored in the data processing unit or converted by a factor or factors developed from prior comparisons with standard samples or tests. The accumulated segments or views making up an image formed by sequential images of the entire unit may also be processed in like manner. The standards within the processor for forming a basis for data conversion can be derived from sample product units having known physical attributes. Thus, a pattern of magnitudes from the separate filtered portions or accumulation of portions for an entire unit can be compared with standards or converted for cross-sectional size and indications of blemish, ripeness and color.

A second sensing system is used as a calibration mechanism in association with the sensors 12 for determining product unit size. This second system includes a sensor 34 which is a conventional line scan camera. The line scan camera is arranged to sense an extended thin rectangular section arranged transversely to the conveying path. In the preferred embodiment, the camera 34 is arranged adjacent to one of the sensors 12 such that the adjacent sensors 12 and 34 view the same area along the conveying path. Rather than measuring light intensity reflected from the product units 10, the sensor 34 recognizes the presence or absence of the product unit at discrete positions, or pixels, across the conveying path. The number of pixels registering the presence of a product unit determines the width of that unit at the area being scanned.

The conveying path adjacent to which the sensors 12 and 34 are arranged is defined by a conveyor having an endless member upon which are mounted support elements 36. The support elements 36 are shown in the embodiment to be bowtie rollers supporting conveyed product units 10. Off-loading elements ma be positioned between the rollers 36 to move with the conveyor and to be actuated at appropriate times to force the product units 10 from the conveyor. Reference is again made to U.S. patent application Ser. No. 479,107, filed Feb. 13, 1990, as disclosing a conveyor contemplated for the preferred embodiment.

Turning to the overall layout, a central processing unit 16 is shown to be associated with the fiber optic cables 14 and in turn the sensors or lens assemblies 12. Four such cables 14 and sensors 12 are coupled with the processing unit 16. The sensors 12 are located directly above the concavities defined by the support elements 36 on the conveyor. This positioning also places the sensors 12 directly above the product units 10 which are conveyed along the conveying path. The conveyor moves in the direction of the arrow 38 seen in FIG. 1. Thus, the product units 10 conveyed along the conveying path are viewed by the sensors 12 in seriatim. Lights 40 illuminate the sensing areas.

Between each sensor 12, a drive 42 is positioned to rotate the rollers forming the support elements 36 and in turn the product units 10 positioned thereon. There are three drives 42 so positioned. With the support elements 36 rotatable, a roughened strip or runner may be employed as the drive 42 to come into contact with the under side of the elements 36 for a specified length along the conveying path. Such an arrangement is best illustrated in FIGS. 1 and 2. The use of such runners allows the product to be rotated a specific amount on the conveyor. The drives are selected to extend for a sufficient, finite distance such that the product units 10 located thereon are rotated approximately 90°. Naturally, the size and shapes of the product units 10 have a bearing on the degree of rotation. For smaller diameter products, a rotation of approximately 120° would occur. The contact between the runners 42 and the rollers 36 is empirically determined to be sufficient to prevent slippage therebetween.

The spacing of the drives 42 and the sensors 12 are such that the product units are not rotating at the time of sensing by the sensors 12. In the preferred embodiment, the sensors are on 9" centers with the rollers being mutually spaced on 1¼" centers and the runners being 4" in length and positioned equidistant between the sensors. By not rotating during observation, sensing of a specific surface and cross section is achieved. Rotation of the product units through substantially less than 180° between observations provides for observation of substantially all of the surface of the product unit without relying on views of the limb areas where the surface is foreshortened to the sensor 12. Four rotations to achieve a complete revolution of a product unit have been found to be most advantageous without overburdening the system with diminishing returns.

Located before the first sensor 12 is an extended drive 44 for rotation of the support elements 36. This extended drive in the preferred embodiment is 4 feet where the drives 42 are 4 inches. The extended drive 44 assists in the distribution of the product units on the conveyor. It has been found that this rotation of the product units through several revolutions assists in the singulation of the units and a better orientation for reading. Again, the drive stops before the first sensor 12 in order that the product units are not rotating when being observed.

Adjacent to the conveying path so as to be observable by the line scan camera 34 is a standard object 46 retained within a pocket 48 in the sheet metal 50 associated with the side areas of the conveyor. The standard object 46 found useful in the preferred embodiment is a length of white pipe. The line scan sensor 34 is arranged such that the viewing angle of the camera extends across this standard object 46. To achieve the appropriate positioning of the adjacent sensors 12 and 34, the sensor 12 is angled at 2° from the vertical while the sensor 34 is angled at 4° from the vertical.

Figure 4:
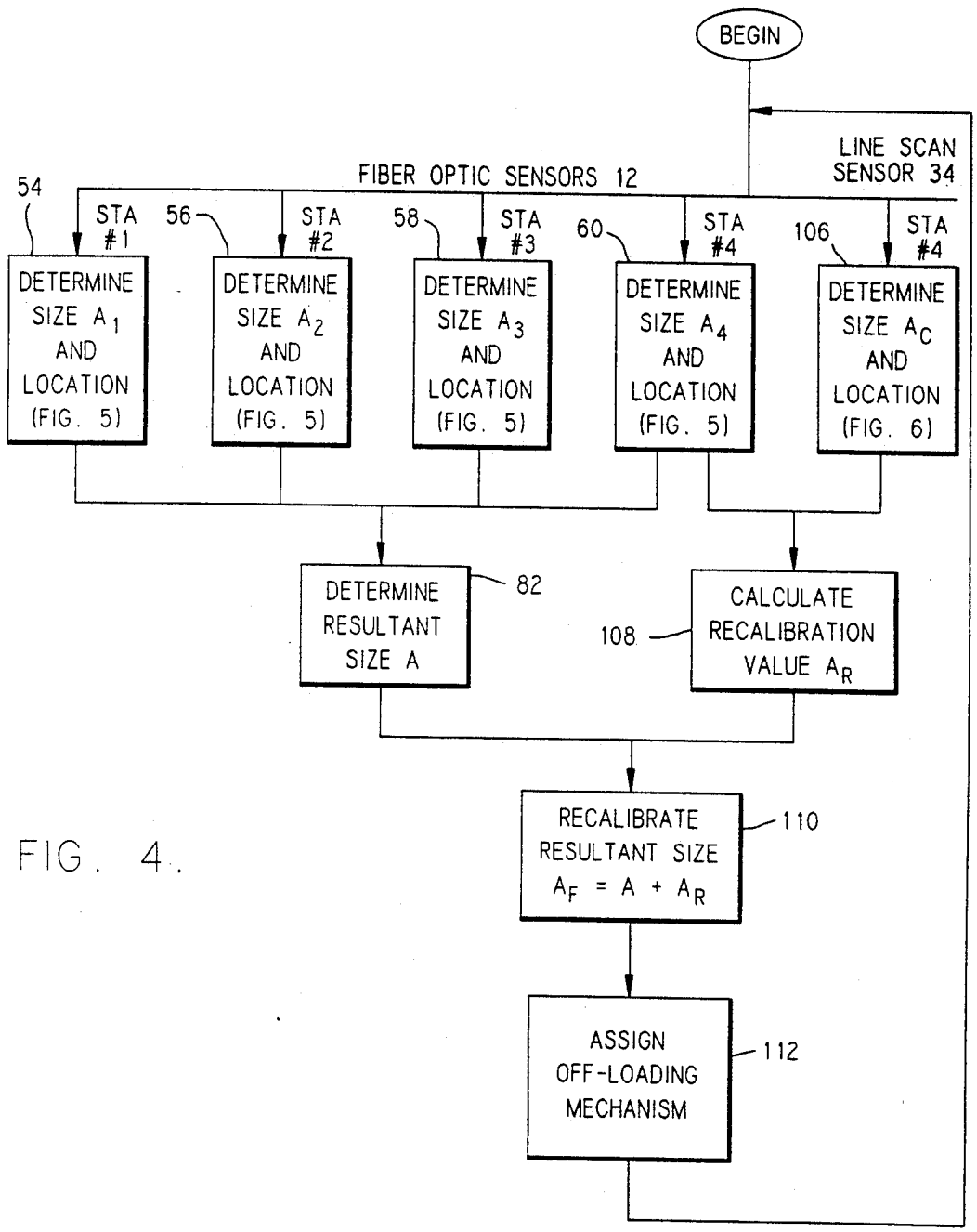
FIG. 4 is a logic flow chart of a sensing system of the present invention.

Turning to the system logic for selected discrimination of the product units, among other possible physical attributes sensed, each sensor 12 and 34 senses a representation of cross-sectional size of the product units 10. In the preferred embodiment, this includes four fiber optic sensors 12 and one line scan camera 34. All of these units are coupled with the signal conditioning and processing unit 16. The program is initiated at step 52 as seen in FIG. 4. This initiates the fiber optic sensing logic associated with sensors 12 located at stations 1 through 4. Also initiated is the program associated with the line scan camera sensor 34 located at the fourth station adjacent the sensor 12. Thus, at steps 54, 56, 58 and 60 four sizes of a product unit are determined and the location of that unit on the conveyor is established. Looking in greater detail at the logic associated with the determination of size by the fiber optic sensors 12, reference is made to FIG. 5.

At step 62, the product length is set to zero. Product length is the length of the product in the direction of motion of the conveyor regardless of the product orientation. For example, what might normally be thought of as the product length may be lying crosswise to the conveyor and hence become its width as recognized by the system for purposes of discrimination. The length is measured in units of movement of the conveyor by an indexing mechanism associated with the conveyor.

The summation of light magnitudes perceived by the photodiodes 30 is also set to zero as are any nonsummed specific magnitudes which are stored by the system. With multiple diodes 32, a plurality of light magnitudes may be stored in separate sums or operated upon and then stored individually or as summations. In the present example, four such magnitudes are processed by the system with options as to how they may be processed, and stored.

Step 64 sequences the measurement of light magnitude to coincide with the presentation of a new unit length of product. This step is controlled by the indexing mechanism for the conveyor. The indexing mechanism employs an encoder generating a signal indicative of specific advancement beyond any prior advancement. Consequently, no signal is received during a backup of the conveyor or advancement of the conveyor following a backup until a new increment of advancement has been sensed. Thus, step 64 will be inactive through such motion until receiving the next encoder signal representing the advancement of the conveyor beyond all prior advancements. By viewing sequential portions, or slices, of the product as it passes through the scan area, a line scan process is approximated. However, the light received is averaged and individual units of the line scan, or pixels, do not exist. Thus, the useful attribute received is in the form of averaged selected spectra magnitudes.

Step 66 receives the magnitude of each light spectra sensed as the successive unit length passes through the scan area. This receipt of signals is controlled by step 64 such that contiguous areas each one increment in length (⅛" in the preferred embodiment) and the actual dimension of the product transverse to the direction of motion of the conveyor are scanned and received in step 66. The magnitudes of the selected light spectra are sensed by the photodiodes 32 and may be stored or operated upon and then stored at this step.

Step 68 detects whether or not a product unit is present and whether or not the product unit just ceased to be present at the scan area. A threshold intensity is required at step 68. This minimum is preferably adjustable and is typically set at approximately the equivalent of ⅛" in sensed product width. Thus, the collection of data does not begin until a magnitude equivalent of at least approximately ⅛" of width is sensed and ends when less than ⅛" is sensed following the passage of a product unit. The adjustability gives control over the sensitivity of the system to items on the conveyor so as to control recognition of product units and debris having a maximum width below the threshold.

If no product is sensed and no product was sensed in the just prior view, the PRODUCT NOT PRESENT logic path 70 is selected. Under this circumstance, the logic step 62 is again initiated. If a product is sensed as being present, the PRODUCT PRESENT logic path 72 is followed. If a product unit is not sensed but the just prior view or views did sense a product unit, the PRODUCT END logic path 74 is followed.

In the PRODUCT PRESENT logic path 72, when a product is sensed, the magnitude of each light spectra is added to any prior sum of such magnitudes in logic step 76. When the first sensing of a product unit passing through the viewing station occurs, the sum is zero from logic step 62. In successive views, each reading is added to the cumulative sum of magnitudes. The length is also summed in a similar manner with each sensed view being added to the prior length in step 78. Logic step 64 is then initiated to time the next reading.

The PRODUCT END logic path 74 represents the conclusion of the sensing process by an individual sensor on a product unit 10. In this path, logic step 80 allows the selection of an algorithm for calculating one or more of a plurality of physical attributes. Such attributes might include color, size and product grade. In the case of size, the sum of product magnitudes from each repeated measurement during the passage of a product unit 10 by a sensor 12 in association with the product length may give a sufficient approximation of cross-sectional area $A_N$ that the size or weight of the product unit might be determined. Under such circumstances, the readings might be used directly to provide discrimination or might be first converted into conventional units such as weight or volume through a comparison of the sensed values with a standard. Such a comparison might be undertaken with a constant factor, a table or other conventional means by which a standard is integrated into the interpretation of measured data. At this point, reference may again be made to FIG. 4 where information specifically regarding product size and location is transmitted from each of logic steps 54, 56, 58 and 60 to logic step 82.

At logic step 82, a summed magnitude indicative of a first value representation of size and a location of the product unit 10 associated with the value representative of size is accumulated from each of logic steps 54, 56, 58 and 60. At logic step 82, the values $A_N$ representative of size from each of logic steps 54-60 correlated to a specific product unit 10 are combined to determine a resultant size A. All values $A_N$ may be averaged to determine a resultant size A. The greatest and the least representations may be discarded from the calculation and the remaining measurements averaged for a determination of size or weight as well. Thus, a number of calculations are possible for discriminating between product units 10 based on size. Other selections can be made. The product units could be sorted by either the greatest or the least measurement. The representations of area $A_N$ for each product unit may be compared. A ratio of the greatest and the least representations may be calculated and compared to a standard. Where the ratio deviates beyond a specified standard from unity, an override signal may relegate the product unit to an off size or grade station along the conveyor. Particular anomalies could be recognized as indicating defects.

Figure 6:
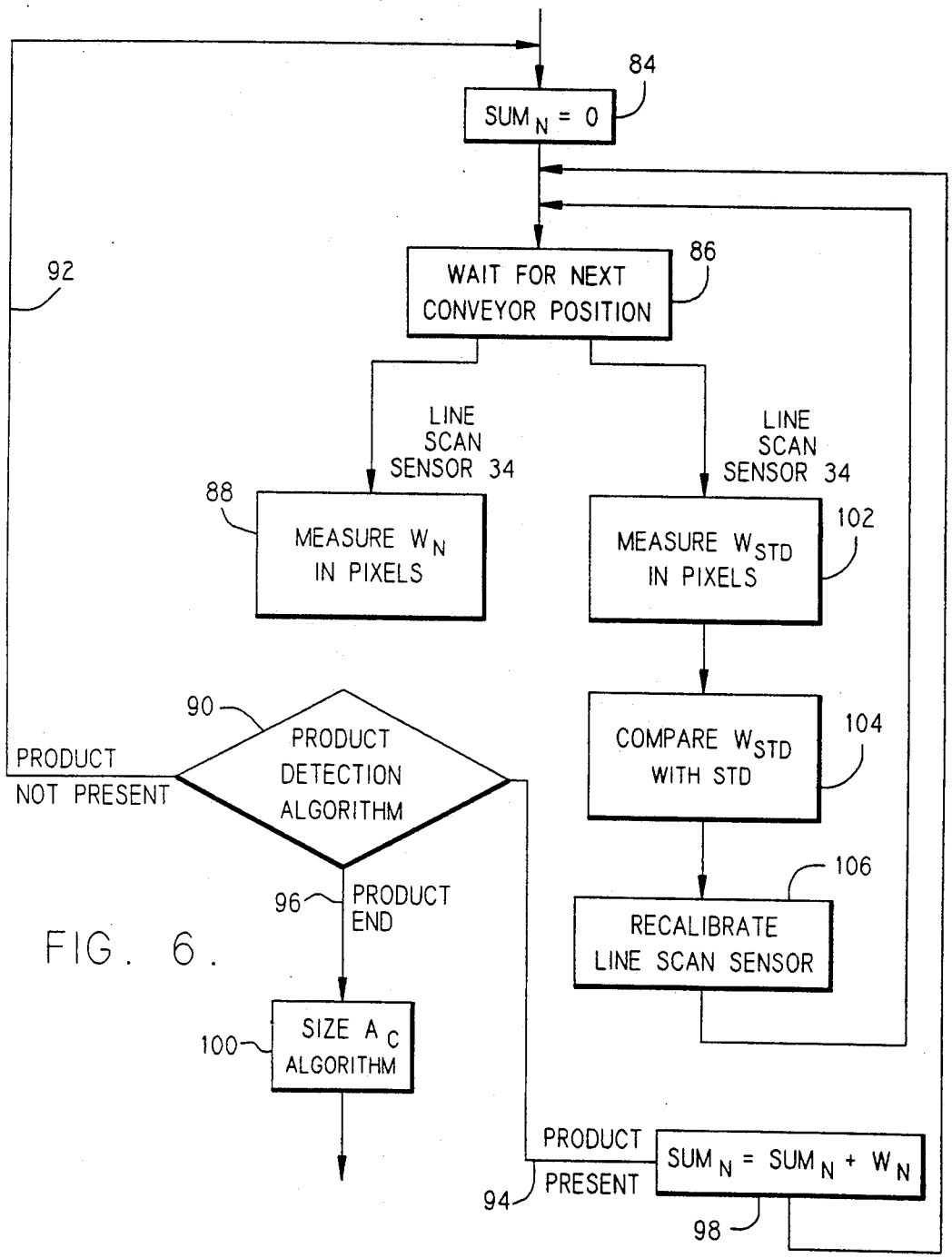
FIG. 6 is a logic flow chart of a line scan sensing unit.

Simultaneously with processing through the sensors 12, the line scan camera of sensor 34 is also processing data indicative of the physical attributes of product units 10. Reference is made to FIG. 6. Step 84 initializes the sensed values, i.e. the product length and the accumulated pixel count indicative of product area.

Step 86 sequences the measurement of width by the line scan camera to coincide with the presentation of a new unit length of product. This step is controlled by the indexing mechanism as with sensors 12. Step 88 senses and stores a value $W_N$ representative of width measured in pixels. This stored value represents one unit of length along the conveying direction and the width of the product unit at that location. This number of pixels represents a cross-sectional area which is the width of the product unit and is one unit in length.

Step 90 detects whether or not a product unit is present and whether or not the product unit just ceased to be present at the sensing station. In this regard, the step employs a product detection algorithm as in step 68 to the same end. If no product is sensed and no product was sensed in the just prior view, the PRODUCT NOT PRESENT logic path 92 is selected. Under this circumstance, logic step 84 is again initiated. If a product is sensed as being present, the PRODUCT PRESENT logic path 94 is followed. If a product unit is not sensed but the just prior view did sense a product unit, the PRODUCT END logic path 96 is followed.

In the PRODUCT PRESENT logic path 94, when a product is sensed, the number of pixels indicating a product present are accumulated and added to any prior sum of such pixels in logic step 98. When the first sensing of a product unit passing through the viewing station occurs, the sum is zero from logic step 84. In successive views, each reading is added to the cumulative su of pixels. Logic step 86 is then initiated to time the next reading.

The PRODUCT END logic path 96 represents the conclusion of the sensing process on a product unit. In this path, logic step 100 allows the selection of an algorithm for defining the cross-sectional size $A_C$ in terms that may be compared with the cross-sectional sizes $A_1$ through $A_4$ of the sensors 12.

Simultaneously with the measurement of the local width of the product unit in pixels by the line scan sensor 34 at step 88, the line scan sensor 34 is also measuring the standard width $W_{STD}$ in pixels of the standard object 46 at step 102. The reading in pixels of the object is compared with a preselected value accurately representative of the width of the standard object 46 at step 104. Any difference between the reading at step 102 and the standard as determined at step 104 is used to recalibrate the line scan sensor 34 as to its full line scan width traversing both the standard object 46 and the conveying path where product units 10 are sensed at step 106. This process of recalibration may be undertaken at each initiation at step 86.

Returning to FIG. 4, logic 106 determining the size $A_C$ and location using the line scan sensor 34 is undertaken at the same station along the conveyor as determining the size $A_4$ and location at step 60 using the fiber optic sensor 12 last in line. The algebraic difference of the size $A_C$ less the size $A_4$ is then calculated at step 108 to determine a recalibration value $A_R$. At step 110, this algebraic difference $A_R$ is added to the resultant size A determined at step 82 to recalibrate the resultant size to achieve a final size $A_F$.

Figure 5:
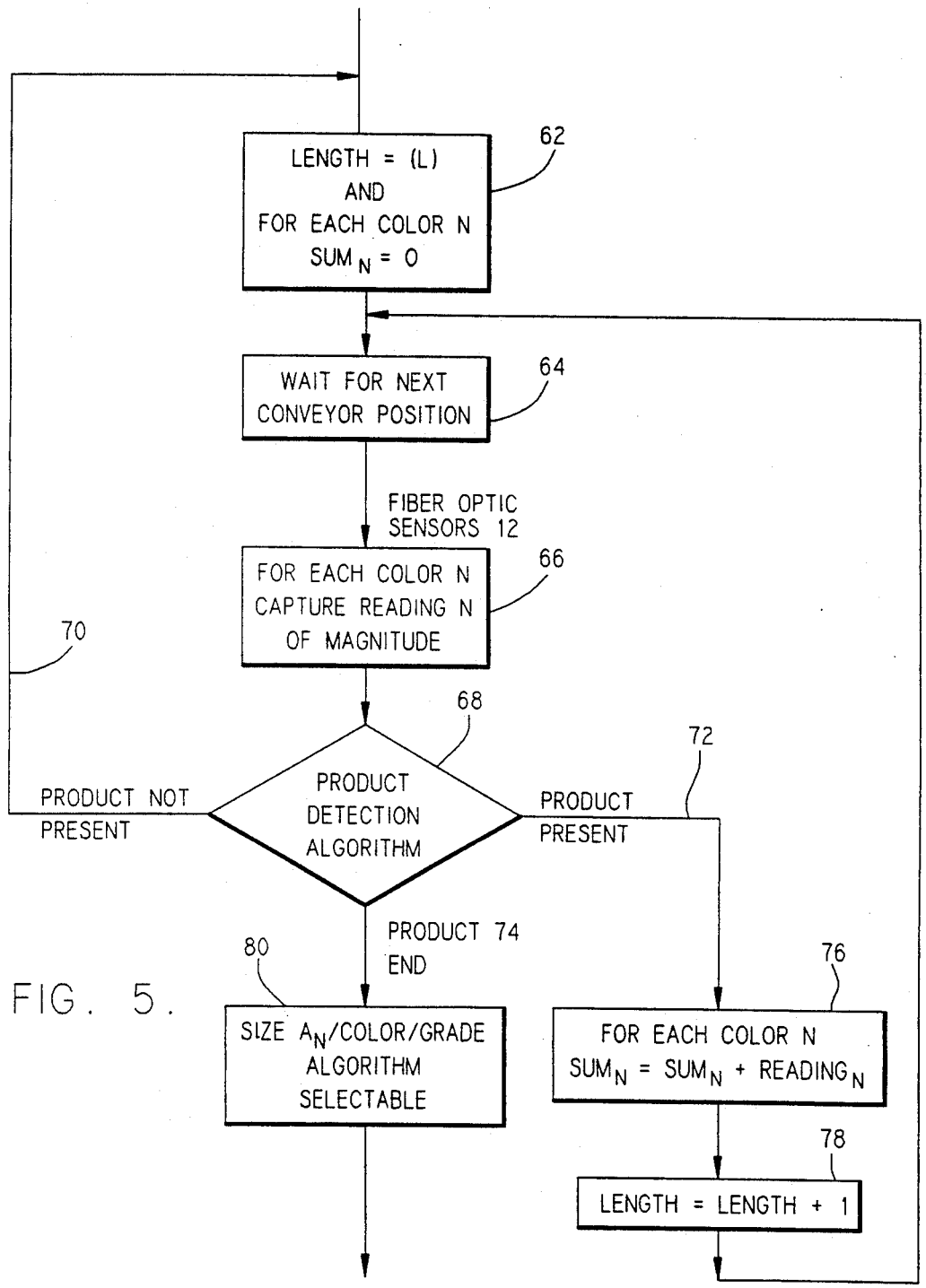
FIG. 5 is a logic flow chart of a sensing unit.

At anywhere along the process, the size sensed as a cross-sectional area may be converted into a volume, weight, or agricultural standard size. The process then assigns and off-loading mechanism at step 112. This assignment at step 112 may be based on multiple categories. In the specific logic circuit of FIG. 4, size is determined. However, the logic circuit of FIG. 5 provides for a determination of color and grade. Thus, for example, off-loading mechanisms may be provided to direct off grade product units at a separate station regardless of size, direct immature product units according to size into one set of exits and direct ripe product units to another set of exits according to size.

The recalibration of the resultant size A through the addition of the algebraic difference resulting in recalibration value $A_R$ accommodates shifts in area magnitudes discerned by the sensors 12 resulting from factors such as ripeness, blemishes or the like. In this way, greater accuracy is achieved without significantly increasing mechanisms, data handling volume, complexity and cost.

As mentioned above, the indication of size using magnitude of reflected light can vary depending upon other conditions of the product units. This variation may be used with some produce to discern the degree of ripeness of each product unit. To this end, the magnitude of the difference defined by the recalibration value $A_R$ can be indicative of ripeness. This magnitude may, therefore, be employed as a primary means for determining product unit ripeness or as a backup to other color analysis.

Accordingly, an improved method and device for the discrimination of product units has been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A method for measuring size of a product unit, comprising
  sensing size of the product unit more than one time using first sensors to measure the magnitude of selected spectra of reflected light from the product unit and, from each sensing time, accumulating a first value representative of size for the product unit;
  determining a resultant value of size for the product unit from the first values representative of size;
  sensing size of the product unit using a line scan camera adjacent to one of the first sensors and accumulating a second value representative of size for the product unit;
  recalibrating the resultant value by algebraically adding to the resultant value the algebraic difference of the first value for the product unit accumulated from the first sensor adjacent to the line scan camera less the second value.

2. The method of claim 1 wherein said step of sensing with the line scan camera includes sensing a representation of area of the product units in pixels.

3. The method of claim 1 wherein said step of sensing with the line scan camera is substantially simultaneous with sensing size of the product unit using the adjacent first sensor in said step of sensing using the first sensors.

4. The method of claim 3 wherein said step of sensing size of the product unit using the adjacent first sensor in said step of sensing with the first sensors is the last sensing of the product unit in said step of sensing with the first sensors.

5. The method of claim 1 further comprising
  conveying the product unit along a conveying path;
  said step of sensing size of the product unit more than one time using first sensors includes each time repeatedly measuring in a thin scan area extending across the conveying path to cover substantially contiguous areas of the product unit the magnitude of selected spectra of reflected light as the product unit is conveyed along the conveying path.

6. A method for measuring size of a product unit, comprising
  sensing size of the product unit more than one time using first sensors and, from each sensing time, accumulating a first value representative of size for the product unit;
  determining a resultant value of size for the product unit from the first values representative of size;
  sensing size of the product unit using a second sensor adjacent to one of the first sensors and accumulating a second value representative of size for the product unit;
  simultaneously with said step of sensing size of the product unit using the second sensor, sensing with the second sensor a standard object adjacent to the conveying path;
  recalibrating the second sensor to make the value sensed of the standard object equal to a preselected value;
  recalibrating the resultant value by algebraically adding to the resultant value the algebraic difference of the first value for the product unit accumulated from the first sensor adjacent to the second sensor less the second value.

7. The method of claim 6 wherein said step of sensing size using the first sensors includes measuring the magnitude of selected spectra of reflected light from the product units.

8. The method of claim 6 wherein said step of sensing size using the second sensor includes using a line scan camera.

9. The method of claim 8 wherein said step of sensing with the line scan camera includes sensing a representation of area of the product units in pixels.

10. The method of claim 9 wherein said step of sensing the standard object with the line scan camera includes sensing a representation of area of the standard object in pixels.

11. The method of claim 6 wherein said step of sensing with the second sensor is substantially simultaneous with sensing size of the product unit using the adjacent first sensor in said step of sensing using the first sensors.

12. The method of claim 11 wherein said step of sensing size of the product unit using the adjacent first sensor in said step of sensing with the first sensors is the last sensing of the product unit in said step of sensing with the first sensors.

13. The method of claim 6 further comprising
  conveying the product unit along a conveying path;
  said step of sensing size of the product unit more than one time using first sensors includes each time repeatedly measuring in a thin scan area extending across the conveying path to cover substantially contiguous areas of the product unit the magnitude of selected spectra of reflected light as the product unit is conveyed along the conveying path.

14. A method for measuring size of a product unit, comprising
  conveying the product unit along a conveying path;
  sensing size of the product unit more than one time using first sensors including each time repeatedly measuring in a thin scan area extending across the conveying path to cover substantially contiguous areas of the product unit the magnitude of selected spectra of reflected light as the product unit is conveyed along the conveying path and, from each sensing time, accumulating a first value representative of size for the product unit;
  determining a resultant value of size for the product unit from the first values representative of size;
  sensing size of the product unit using a second sensor substantially simultaneously with sensing size of the product unit using the adjacent first sensor in said step of sensing using the first sensors and including using a line scan camera adjacent to one of the first sensors and accumulating a second value representative of size for the product unit;
  simultaneously with said step of sensing size of the product unit using the second sensor, sensing with the second sensor a standard object adjacent to the conveying path;
  recalibrating the second sensor to make the value sensed of the standard object equal to a preselected value;
  recalibrating the resultant value by algebraically adding to the resultant value the algebraic difference of the first value for the product unit accumulated from the first sensor adjacent to the second sensor less the second value.

15. A system for selected discrimination of product units, comprising
  a conveyor having an endless member defining a conveying path;
  a selected standard object positioned on said conveyor adjacent said endless member;

a plurality of first sensors positioned sequentially along said conveying path to sense physical attributes of product units on said endless member;

a second sensor positioned at said conveying path to sense a physical attribute of product units on said endless member and a physical attribute of said selected standard object.

16. The system of claim 15 wherein said second sensor is positioned to sense the physical attribute of product units at substantially the same location on said conveying path as one of said plurality of first sensors.

17. The system of claim 16 wherein said one of said plurality of first sensors is the last said first sensor along said conveying path as determined by the direction of travel of said endless member.

18. The system of claim 15 wherein each said first sensor is a receptor having a lens and a randomly bundled fiber optic cable.

19. The system of claim 15 wherein said second sensor is a line scan camera.

20. The system of claim 19 wherein said line scan camera is programmed to separately measure the width of product units on said conveying path and the width of said standard object.

21. A system for selected discrimination of product units, comprising a conveyor having an endless member defining a conveying path;

a selected standard object positioned on said conveyor adjacent said endless member;

a plurality of first sensors positioned sequentially along said conveying path, each said first sensor being a receptor having a lens and a randomly bundled fiber optic cable to sense physical attributes of product units on said endless member;

a line scan camera positioned at said conveying path programmed to separately measure the width of product units on said conveying path and the width of said standard object.

22. A method for measuring ripeness of a product unit, comprising sensing the cross-sectional area of the product unit by measuring the magnitude of selected spectra of reflected light from the product unit;

measuring the cross-sectional area of the product unit using a line scan camera;

taking the difference between the results of said step of sensing and said step of measuring;

comparing said difference with a standard.

* * * * *